United States Patent
Yoshida et al.

[11] Patent Number: 6,156,224
[45] Date of Patent: Dec. 5, 2000

[54] WORKING FLUID CONTAINING PERFLUORODIMETHYLETHER

[75] Inventors: Yuji Yoshida, Itami; Masami Funakura, Neyagawa; Kazuo Nakatani, Kadoma; Minoru Tagashira, Hirakata, all of Japan

[73] Assignee: Matsushita Electric Industrial Co., Ltd., Osaka, Japan

[21] Appl. No.: 08/073,473

[22] Filed: Jun. 9, 1993

[30] Foreign Application Priority Data

Jun. 19, 1992 [JP] Japan ................................. 4-160749

[51] Int. Cl.$^7$ .......................................................... C09K 5/04
[52] U.S. Cl. .................................................. 252/67; 62/114
[58] Field of Search ................................ 252/67; 62/114

[56] References Cited

U.S. PATENT DOCUMENTS

| | | | |
|---|---|---|---|
| 2,066,905 | 1/1937 | Booth | 260/151 |
| 2,500,388 | 3/1950 | Simons | 260/614 |
| 3,362,180 | 1/1968 | Eiseman, Jr. | 62/112 |
| 3,394,878 | 7/1968 | Eiseman, Jr. | 252/67 |
| 3,409,555 | 11/1968 | Eiseman, Jr. | 252/67 |
| 3,922,228 | 11/1975 | Hutchinson | 252/67 |
| 4,041,148 | 8/1977 | Simons et al. | 252/305 |
| 4,139,607 | 2/1979 | Simons et al. | 252/305 |
| 4,783,276 | 11/1988 | Bohnenn | 252/67 |
| 4,961,321 | 10/1990 | O'Neill et al. | 62/114 |
| 5,061,394 | 10/1991 | Bivens et al. | 252/171 |

FOREIGN PATENT DOCUMENTS

| | | |
|---|---|---|
| 0416777 | 3/1991 | European Pat. Off. . |
| 0443912A1 | 8/1991 | European Pat. Off. . |
| 3-93882 | 4/1991 | Japan . |
| 4-110386 | 4/1992 | Japan . |
| 4253927 | 9/1992 | Japan . |

OTHER PUBLICATIONS

William L. Kopko, "Beyond CFCs: Extending the Search for New Refrigerants," ASHRAE's 1989 CFC Conference, pp. 39–46, 1989 no month available.

Database WPI Week 9322, Derwent Publications Ltd., London, GB; AN 93–182524 & WO–A–9 310 203 (Daikin) May 27, 1993.

Berenblit et al, "Nature of Products of Electrochemical Fluorination of Ethylene Glycol Ethers", Chem. Abs. 82(7)43287; 1974 no month available.

*Primary Examiner*—Christine Skane
*Attorney, Agent, or Firm*—Stevens, Davis, Miller & Mosher, LLP

[57] ABSTRACT

A mixed working fluid having almost no influence on stratosphere ozone layer and capable of being a substitute for R22, comprising 15 to 90% by weight perfluorodimethylether and one or two selected from fluorinated dimethylethers consisting of exclusively two carbon atoms, one oxygen atom, hydrogen atoms and fluorine atoms, said fluorodimethylether being selected from the group consisting of 85% by weight or less pentafluorodimethylether, 50% by weight of less dimethylether, 60% by weight or less trifluorodimethylether, 60% by weight of less tetrafluorodimethylether, and 50% by weight or less difluorodimethylether.

12 Claims, 5 Drawing Sheets

000# WORKING FLUID CONTAINING PERFLUORODIMETHYLETHER

BACKGROUND OF THE INVENTION

1. Field of the Invention

The present invention relates to a working fluid for use in heat pump systems for air conditioners, refrigerators and the like in which one or a plurality of compressors, condensers, expansion devices, and evaporators are connected in service.

2. Description of the Related Art

Conventional heat pump systems for air conditioners and refrigerators have utilized as working fluids halogenated hydrocarbons derived from methane or ethane such as fluorinated hydrocarbons so-called freon (referred to as R○○, or R○○○ hereunder) which are generally used at temperatures in the range of about 0° C. to about 50° C. as condensation temperature and/or evaporation temperature, as well known in the art. Among them chlorodifluoromethane ($CHClF_2$, R22, boiling point: −40.8° C.) has been widely used as working fluid in domestic air conditioners, building air conditioners and large scale refrigerators.

However, the destruction of the ozone layer in the stratosphere with freon has in recent years become one of global environmental problems, and some fully halogenated hydrocarbons, for example, chlorofluorocarbons (CFCs) having a great stratosphere ozone depletion potential have already been regulated about their amounts to be used as well as to be produced under the Montreal Protocol and further there is a drift to inhibit the use and the production of CFCs in future. R22 has a trivial stratosphere ozone depletion potential of 0.05 based on the unity of ozone depletion potential (referred to as ODP hereunder) of trichlorofluoromethane and is not CFCs. However, R22 is expected to be increasingly used in future. Since refrigerators and air conditioners have been widely spread until now, the amount of R22 to be used and the production thereof are expected to increase so that they will have a great influence on the human life environment Therefore, there is an intensive need to develope substitutes for R22 which is able to destroy stratosphere ozone layer, though trivial in the ozone depletion potential, as early as possible.

The present invention has been derived to overcome the problems as described above and intends to provide a working fluid having little influence on the stratosphere ozone layer which may be used as a substitute for R22.

In order to achieve almost no influence on the stratosphere ozone layer, it is necessary to contain no chlorine in the molecular structure. As possible materials to satisfy this necessary condition there have been proposed fluorinated hydrocarbons containing no chlorine. The present invention proposes a mixture of fluorinated dimethylethers containing no chlorine. The dimethylethers are expressed hereunder as E○○○ where the number at the position next to the E represents the total of the number of carbon atoms minus one, the number at the second cipher after the E represents the total of the number of hydrogen atoms plus one, and the last cipher represents the number of fluorine atoms. One single candidate of such substitute working fluids is disclosed together with boiling points in W. L. Kopko, "Beyond CFCs: Extending the Search for New Refrigerants" ASHRAE's 1989 CFC Conf. pp. 39–46 (1989.9).

Prior art patents concerning with fluorinated ethers containing no chlorine are, for example, as follows: U.S. Pat. No. 2,066,905 describes trifluorodimethylether (E143, $C_2H_3F_3O$); U.S. Pat. No. 2,500,388 describes perfluorodimethyether (E116, $CF_3$—O—$CHF_2$, bp. −59° C.); U.S. Pat. No. 3,362,180 describes pentafluorodimethylether (E125, $CF_3$—O—$CF_2$, bp. −35° C.) and tetrafluorodimethylether (E134a, $CF_3$—O—$CH_2F$, bp. −20° C.); U.S. Pat. No. 3,394,878 describes an azeotope of trifluorodimethylether (E143a, $CF_3$—O—$CH_3$, bp. −23° C.) and an azeotope of perfluorodimethyether (E116, $CF_3$—O—$CF_3$, bp. −59° C.); U.S. Pat. No. 3,409,555 describes a minimum boiling azeotope of trifluoromethyltrifluoroethylether ($CF_3$—O—$CH_2$—$CF_3$, bp. +5.6° C.) and dichlorofluoromethane (R21, bp. +9° C.); U.S. Pat. No. 3,922,228 describes a maximum boiling azeotope of pentafluorodimethylether (E125, $CF_3$—O—$CHF_2$, bp. −35° C.) and dimethylether (E170, $CH_3$—O—$CH_3$, bp. −24° C.); U.S. Pat. No. 4,041,148 describes a mixture of bis-difluoromethylether (E134, $CHF_2$—O—$CHF_2$, bp. +5° C.) and perfluorodimethylether (E116, $CF_3$—O—$CF_3$, bp. −59° C.); U.S. Pat. No. 4,139,607 describes a mixture of bis-difluoromethylether (E134, $CHF_2$—O—$CHF_2$, bp. +5° C.) and carbon dioxide gas ($CO_2$); U.S. Pat. No. 4,783,276 describes a azeotope of dimethylether (E170, $CH_3$—O—$CH_3$, bp. −24° C.) and dichlorodifluoromethane (R12, bp. −30° C.); U.S. Pat. No. 4,961,321 describes a mixture of bis-difluoromethylether (E134, $CHF_2$—O—$CHF_2$, bp. +5° C.) and fluorinated hydrocarbon containing no chlorine; U.S. Pat. No. 5,061,394 describes a maximum boiling azeotope of dimethylether (E170, $CH_3$—O—$CH_3$, bp. −24° C.) chlorotetrafluoroethane (R124, bp. −10° C.); EP 443,912A describes a maximum boiling azeotope of dimethylether (E170, $CH_3$—O—$CH_3$, bp. −24° C.) and 1,1,1,2-tetrafluoroethane (R134a, bp. −27° C.). However, these working fluids have a greately different boiling point from chlorodifluoromethane (R22, bp. −40.8° C.) so that they can not be used as they are in the existing appliances using R22.

SUMMARY OF THE INVENTION

The primary object of the present invention is to provide a mixed working fluid comprising 15 to 90% by weight perfluorodimethylether and one or two selected from fluorinated dimethylethers consisting of two carbon atoms, one oxygen atom, hydrogen atoms and fluorine atoms, said fluorodimethylether being selected from the group consisting of 85% by weight or less pentafluorodimethylether, 50% by weight of less dimethylether, 60% by weight or less trifluorodimethylether, 60% by weight of less tetrafluorodimethylether, and 50% by weight or less difluorodimethylether.

Another object of the present invention is to provide a mixed working fluid as described above, comprising 15 to 90% by weight perfluorodimethylether, one or two selected from fluorinated dimethylethers consisting of two carbon atoms, one oxygen atom, hydrogen atoms and fluorine atoms, and a fluorinated hydrocarbon containing no chlorine selected from the group consisting of difluoromethane, pentafluoroethane, 1,1,1-trifluoroethane, 1,1,1,2-tetrafluoroethane, and 1,1-difluoroethane.

Still another object of the present invention is to provide a heat pump using the mixed working fluid as described above, comprising 15 to 90% by weight perfluorodimethylether, and one or two selected from fluorinated dimethylethers consisting of two carbon atoms, one oxygen atom, hydrogen atoms and fluorine atoms.

Still another object of the present invention is to provide a heat pump using the mixed working fluid as described above, comprising 15 to 90% by weight perfluorodimethylether, one or two selected from fluorinated dimethylethers consisting of two carbon atoms, one oxygen atom, hydrogen atoms and fluorine atoms, and a fluorinated hydrocarbon containing no chlorine selected from the group consisting of difluoromethane, pentafluoroethane, 1,1,1-trifluoroethane, 1,1,1,2-tetrafluoroethane, and 1,1-difluoroethane.

BRIEF DESCRIPTION OF THE DRAWINGS

In these Figures, the line 1 represents a vapor-liquid equilibrium line (corresponding to R22 at 0° C.) and the line 2 represents a vapor-liquid equilibrium line (corresponding to R22 at 50° C.).

DETAILED DESCRIPTION OF PREFERRED EMBODIMENTS

In order to overcome the aforementioned problems, the present invention is to provide a mixed working fluid consisting of perfluorodimethylether and dimethylethers comprising one or two selected from fluorinated dimethylethers consisting exclusively of two carbon atoms, one oxygen atom, hydrogen atoms and fluorine atoms. The present invention is characterized in that the compositions of the mixtures are specified to have almost the same vapor pressure as that of R22.

Here perfluorodimethylether (E116, $CF_3$—O—$CF_3$, bp. −59° C.) is an ether containing no chlorine in its molecular structure having almost no ozone depletion potential. perfluorodimethylether (E116) has a boiling point of about −59° C. under atmospheric pressure and uniquely among dimethylethers a lower boiling point than that of R22. However, E116 is esimated to have a critical temperature not higher than about +50° C. and so high vapor pressure that it alone can not be used in refrigerators and heat pumps which operate at temperatures in the range of about 0 to about 50° C. In the present invention, perfluorodimethylether (E116) is mixed with a dimethylether having a higher boiling point than that of R22 to make the vapor pressure of the mixture approximately equal to that of R22, thereby allowing a working fluid scarcely having ODP to be obtained.

The fluorinated dimethylethers consisting exclusively of two carbon atoms, one oxygen atom, hydrogen atoms and fluorine atoms have little ozone depletion potential because of containing no chlorine atom. Particularly the ethers containing hydrogen atoms have a boiling point not less than −40° C. under atmospheric pressure so that they can be mixed to produce a mixture having the same boiling point as that of chlorodifluoromethane (R22). Preferably the ethers should be one or two selected from the group consisting of pentafluorodimethylether (E125, $CF_3$—O—$CHF_2$, bp. −35° C.), dimethylether (E170, $CH_3$—O—$CH_3$, bp. −24° C.), trifluorodimethylether (E143a, $CF_3$—O—$CH_3$, bp. −23° C.), tetrafluorodimethylether (E134a, $CF_3$—O—$CH_2F$, bp. −20° C.), and difluorodimethylether (E152a, $CHF_2$—O—$CH_3$, bp. −5° C.).

Making use of the aforementioned combinations, the present invention allows the achievement of almost no influence on the stratosphere ozone layer much less than the influence with R22 by providing a working fluid consisting of a mixture comprising perfluorodimethylether which is an ether having no chlorine in its molecular structure and little ozone depletion potential (ODP=0) and one or two selected from the ethers having a boiling point of no less than −40° C. under atmospheric pressure and little ozone depletion potential containing no chlorine in their molecular structure (ODP=0).

The present invention can provide a working fluid capable of being used in the existing appliances by controlling the composition of the working fluid within specified limits, which has a vapor pressure on the same order as that of R22 at temperatures in the range of about 0 to about 50° C. for air conditioners and refrigerators to work and which can be substituted for R22.

The working fluids of the aforementioned combinations having a composition in the specified range are expected to have a zero ODP and to be extremely promising for substitutes for R22. These mixtures are expected to be non-azeotopic mixtures exhibiting a temperature gradient during the condensing and evaporating processes so that they will be able to have a higher coefficient of performance (COP) than that of R22 by constituting a Lorenz Cycle having a temperature difference close to thermal sources.

The present invention will be described with reference to Examples which are not to be construed as limiting the scope of the present invention.

The dimethylethers have not necessarily been determined, but can be evaluated for their critical points from their chemical structures. Moreover, estimation of the vapor pressure of the working fluids consisting of the mixture can be made considerably precisely by known techniques. The following illustrates Examples of the working fluids according to the present invention with reference to drawings of esimated vapor pressures.

Figure 1:
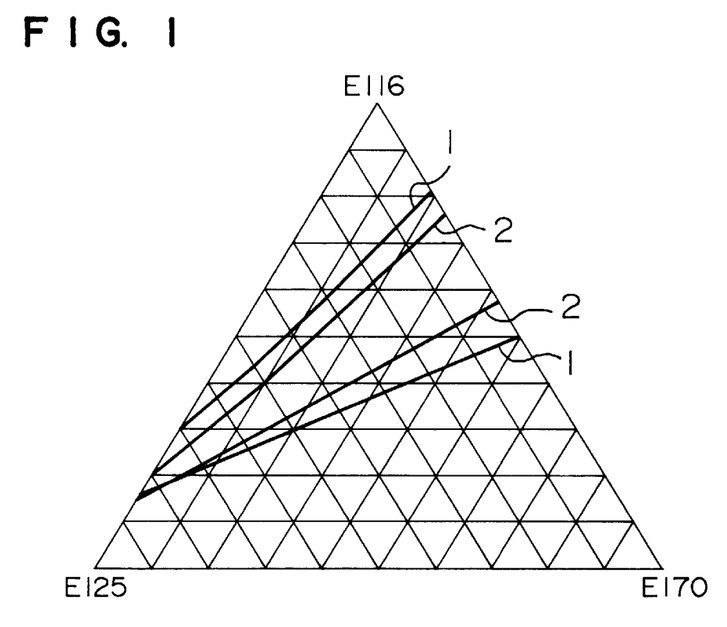
FIG. 1 is a ternary diagram showing the equilibrium lines of a working fluid consisting of a mixture of three ethers, E116, E125 and E170 at a constant temperature under a constant pressure.

FIG. 1 is a ternary diagram showing the equilibrium conditions of an ether mixture, which consists of three ethers, perfluorodimethylether (E116, $CF_3$—O—$CF_3$, bp. −59° C.), pentafluorodimethylether (E125, $CF_3$—O—$CHF_2$, bp. −35° C.), and dimethylether (E170, $CH_3$—O—$CH_3$, bp. −24° C.), at a constant temperature under a constant pressure using triangular coodinate.

The ternary diagram has sequentially three single materials disposed at the three apexes, respectively, in a manner as the boiling point of the material becoming higher in the direction counterclockwise from the top apex to the right bottom corner. The composition (by weight) at a point on the ternary diagram can be expressed by the ratio of three distances from the point to each side of the triangle, each of the distances being corresponding to the compositional proportion of the material indicated at the apex opposite to the side.

In FIG. 1, the lines 1 are vapor-liquid phase equilibrium lines of the mixture at a temperature of 0° C. under a pressure of 4.044 kg/cm²G, which temperature and pressure correspond to the saturation conditions of R22. The upper line of the vapor-liquid phase equilibrium lines 1 (corresponding to R22 at a temperature of 0° C.) represents a saturated vapor line while the lower one does a saturated liquid line. In the area sandwiched between the upper and lower lines, the mixture is in a vapor-liquid equilibrium state. The lines 2 are vapor-liquid phase equilibrium lines of the mixture at a temperature of 50° C. under a pressure of 18.782 kg/cm²G, which temperature and pressure also correspond to the saturation conditions of R22.

The compositions along the saturated vapor line boil under a higher pressure than that of R22 and dew under the same pressure as that of R22. The compositions along the saturated liquid line boil under the same pressure as that of R22 and dew under a lower pressure than that of R22. The compositions presented in the area sandwiched between the two lines boil under a higher pressure than that of R22 and dew under a lower pressure than that of R22. Thus the compositions presented in the area sandwiched between the two phase equilibrium lines 2 at 50° C. is transformed from a vapor phase to a liquid phase at 50° C. under a lower pressure than that of R22 and condense from a vapor phase at a higher temperature than 50° C. into a liquid phase at a lower temperature than 50° C. under the same pressure as that of R22. The compositions presented in the area sandwiched between the two phase equilibrium lines 1 at 0° C. is transformed from a liquid phase to a vapor phase at 0° C. under a higher pressure than that of R22 and evaporate from a liquid phase at a lower temperature than 0° C. into a vapor phase at a higher temperature than 0° C. under the same pressure as that of R22.

The use of E116 alone to produce the mixture allows the presence of a saturated state, though 50° C. is possible to exceed the critical temperature, so that the mixture can be used in the heat pumps for air conditoners and refrigerators operable at temperatures in the range of about 0 to about 50° C. .

As can be seen from the Figure, the composition consisting of about 15 to about 80% by weight E116, 0 to about 85% by weight E125, and 0 to about 50% by weight E170 is preferred because it has almost the same vapor pressure as that of R22 at temperatures for practical utilization within the range of 0 to about 50° C. . Moreover, the composition consisting of about 15 to about 75% by weight E116, 0 to about 85% by weight E125, and 0 to about 45% by weight E170 is most preferred because it has almost the same vapor pressure as that of R22 at all the practical temperatures in the range of 0 to about 50° C. Especially the combinations and compositions in the range as described above are expected to have zero ODP so that they afford great promise for working fluids substituting for R22.

Figure 2:
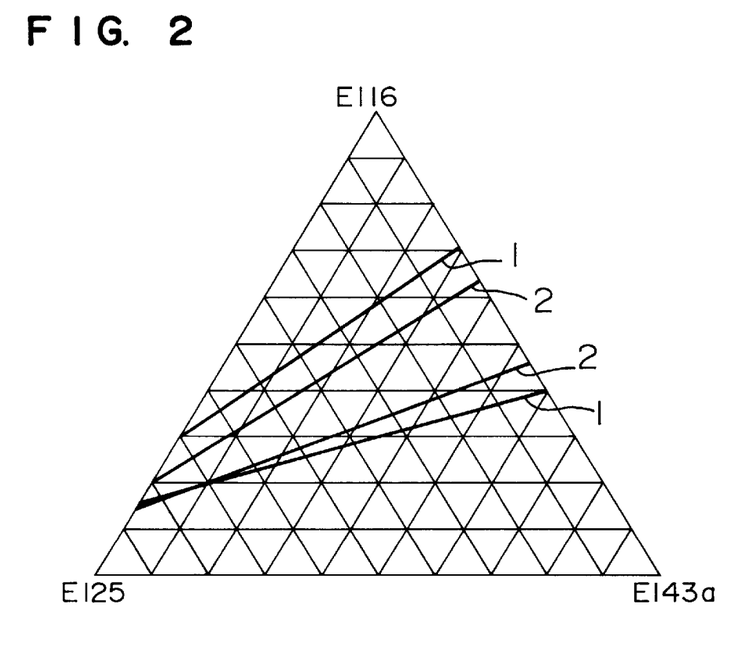
FIG. 2 is a ternary diagram showing the equilibrium lines of a working fluid consisting of a mixture of three ethers, E116, E125 and E143a at a constant temperature under a constant pressure.

FIG. 2 is a ternary diagram showing the equilibrium conditions of an ether mixture, which consists of three ethers, perfluorodimethylether (E116, $CF_3$—O—$CF_3$, bp. −59° C.), pentafluorodimethylether (E125, $CF_3$—O—$CHF_2$, bp. −35° C.), and trifluorodimethylether (E143a, $CF_3$—O—$CH_3$, bp. −23° C.), at a constant temperature under a constant pressure using triangular coodinate. In FIG. 2, the lines 1 are vapor-liquid phase equilibrium lines of the mixture at a temperature of 0° C. under a pressure of 4.044 kg/cm²G, while the lines 2 are vapor-liquid phase equilibrium lines of the mixture at a temperature of 50° C. under a pressure of 18.782 kg/cm²G.

In this case, the composition consisting of about 15 to about 70% by weight E116, 0 to about 85% by weight E125, and 0 to about 60% by weight E143a is preferred because it has almost the same vapor pressure as that of R22, and the composition consisting of about 15 to about 65% by weight E116, 0 to about 85% by weight E125, and 0 to about 55% by weight E143a is most preferred.

Figure 3:
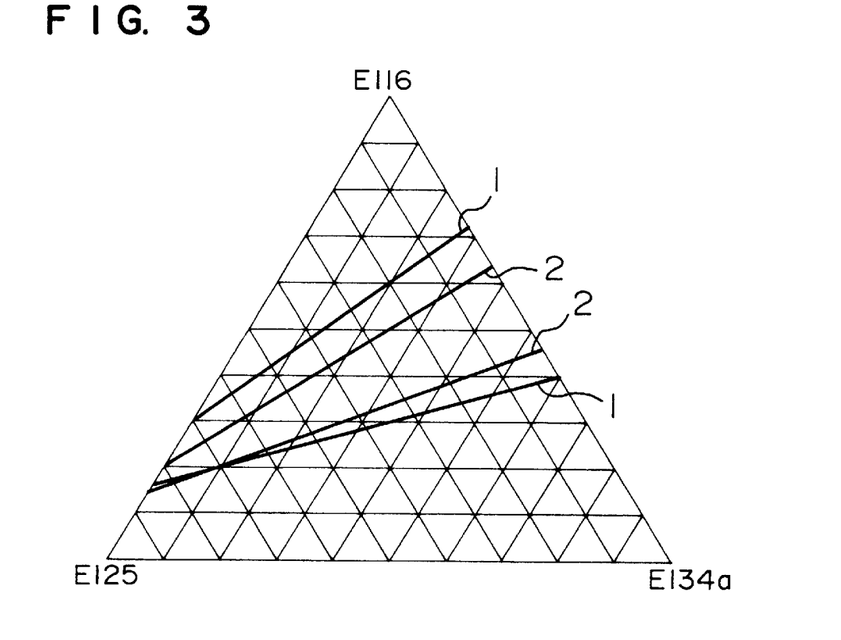
FIG. 3 is a ternary diagram showing the equilibrium lines of a working fluid consisting of a mixture of three ethers, E116, E125 and E134a at a constant temperature under a constant pressure.

FIG. 3 is a ternary diagram showing the equilibrium conditions of an ether mixture, which consists of three ethers, perfluorodimethylether (E116, $CF_3$—O—$CF_3$, bp. −59° C.), pentafluorodimethylether (E125, $CF_3$—O—$CHF_2$, bp. −35° C.), and tetrafluorodimethylether (E134a, $CF_3$—$OCH_2F$, bp. −20° C.), at a constant temperature under a constant pressure using triangular coodinate. In FIG. 3, the lines 1 are vapor-liquid phase equilibrium lines of the mixture at a temperature of 0° C. under a pressure of 4.044 kg/cm²G, while the lines 2 are vapor-liquid phase equilibrium lines of the mixture at a temperature of 50° C. under a pressure of 18.782 kg/cm²G.

In this case, the composition consisting of about 15 to about 70% by weight E116, 0 to about 85% by weight E125, and 0 to about 60% by weight E134a is preferred because it has almost the same vapor pressure as that of R22, and the composition consisting of about 15 to about 65% by weight E116, 0 to about 85% by weight E125, and 0 to about 55% by weight E134a is most preferred.

Figure 4:
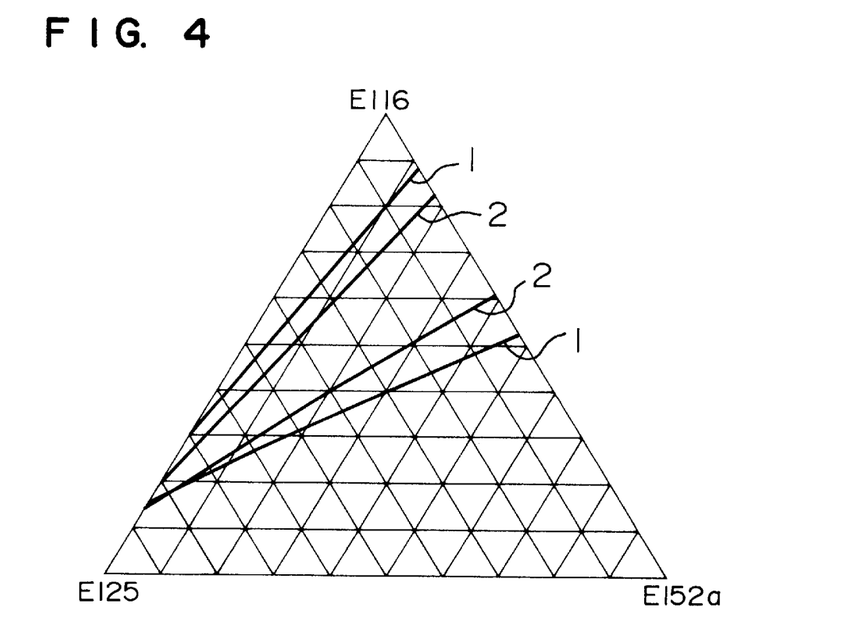
FIG. 4 is a ternary diagram showing the equilibrium lines of a working fluid consisting of a mixture of three ethers, E116, E125 and E152a at a constant temperature under a constant pressure.

FIG. 4 is a ternary diagram showing the equilibrium conditions of an ether mixture, which consists of three ethers, perfluorodimethylether (E116, $CF_3$—O—$CF_3$, bp. −59° C.), pentafluorodimethylether (E125, $CF_3$—O—$CHF_2$, bp. −35° C.), and difluorodimethylether (E152a, $CHF_2$—O—$CH_3$, bp. −5° C.), at a constant temperature under a constant pressure using triangular coodinate. In FIG. 4, the lines 1 are vapor-liquid phase equilibrium lines of the mixture at a temperature of 0° C. under a pressure of 4.044 kg/cm²G, while the lines 2 are vapor-liquid phase equilibrium lines of the mixture at a temperature of 50° C. under a pressure of 18.782 kg/cm²G.

In this case, the composition consisting of about 15 to about 90% by weight E116, 0 to about 85% by weight E125, and 0 to about 50% by weight E152a is preferred because it has almost the same vapor pressure as that of R22, and the composition consisting of about 15 to about 85% by weight E116, 0 to about 85% by weight E125, and 0 to about 40% by weight E152a is most preferred.

Figure 5:
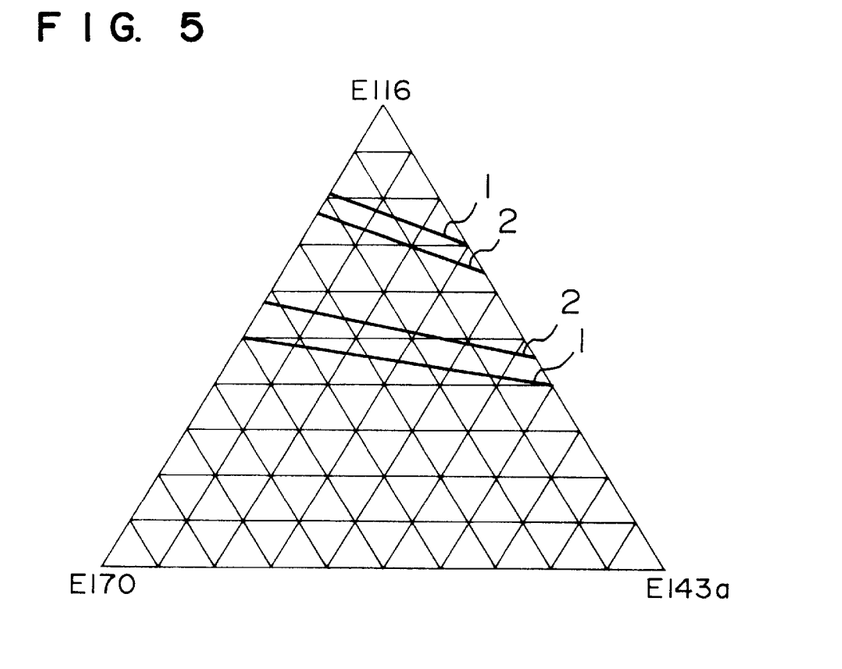
FIG. 5 is a ternary diagram showing the equilibrium lines of a working fluid consisting of a mixture of three ethers, E116, E170 and E143a at a constant temperature under a constant pressure.

FIG. 5 is a ternary diagram showing the equilibrium conditions of an ether mixture, which consists of three ethers, perfluorodimethylether (E116, $CF_3$—O—$CF_3$, bp. −59° C.), dimethylether (E170, $CH_3$—O—$CH_3$, bp. −24° C.), and trifluorodimethylether (E143a, $CF_3$—O—$CH_3$, bp. −23° C.), at a constant temperature under a constant pressure using triangular coodinate. In FIG. 5, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2$ G.

In this case, the composition consisting of about 40 to about 80% by weight E116, 0 to about 50% by weight E170, and 0 to about 60% by weight E143a is preferred because it has almost the same vapor pressure as that of R22, and the composition consisting of about 45 to about 75% by weight E116, 0 to about 45% by weight E170, and 0 to about 55% by weight E143a is most preferred.

Figure 6:
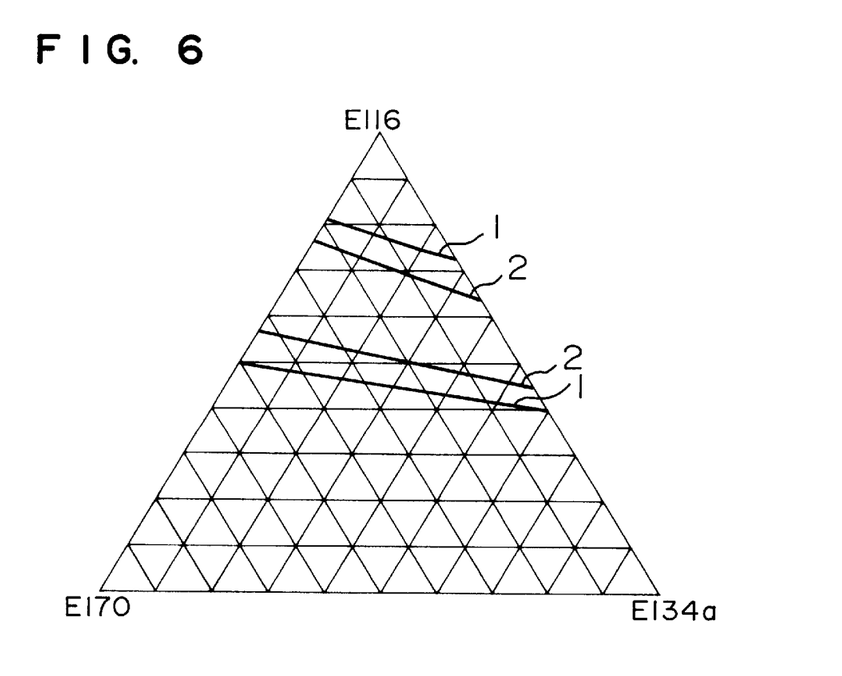
FIG. 6 is a ternary diagram showing the equilibrium lines of a working fluid consisting of a mixture of three ethers, E116, E170 and E134a at a constant temperature under a constant pressure.

FIG. 6 is a ternary diagram showing the equilibrium conditions of an ether mixture, which consists of three ethers, perfluorodimethylether (E116, $CF_3$—O—$CF_3$, bp. −59° C.), dimethylether (E170, $CH_3$—O—$CH_3$, bp. −24° C.), and tetrafluorodimethylether (E134a, $CF_3$—O—$CH_2F$, bp. −20° C.), at a constant temperature under a constant pressure using triangular coodinate. In FIG. 6, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2$ G.

In this case, the composition consisting of about 40 to about 80% by weight E116, 0 to about 50% by weight E170, and 0 to about 60% by weight E134a is preferred because it has almost the same vapor pressure as that of R22, and the composition consisting of about 45 to about 75% by weight E116, 0 to about 45% by weight E170, and 0 to about 55% by weight E134a is most preferred.

Figure 7:
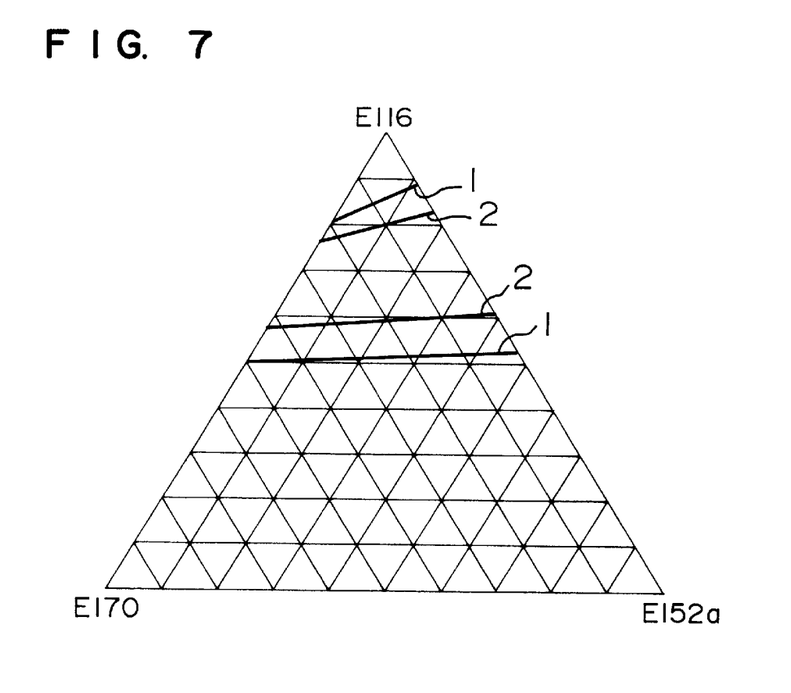
FIG. 7 is a ternary diagram showing the equilibrium lines of a working fluid consisting of a mixture of three ethers, E116, E170 and E152a at a constant temperature under a constant pressure.

FIG. 7 is a ternary diagram showing the equilibrium conditions of an ether mixture, which consists of three ethers, perfluorodimethylether (E116, $CF_3$—O—$CF3$, bp. −59° C.), dimethylether (E170, $CH_3$—O—$CH_3$, bp. −24° C.), and difluorodimethylether (E152a, $CHF_2$—O—$CH_3$, bp. −5° C.), at a constant temperature under a constant pressure using triangular coodinate. In FIG. 7, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2G$.

In this case, the composition consisting of about 50 to about 90% by weight E116, 0 to about 50% by weight E170, and 0 to about 50% by weight E152a is preferred because it has almost the same vapor pressure as that of R22, and the composition consisting of about 60 to about 85% by weight E116, 0 to about 45% by weight E170, and 0 to about 40% by weight E152a is most preferred.

Figure 8:
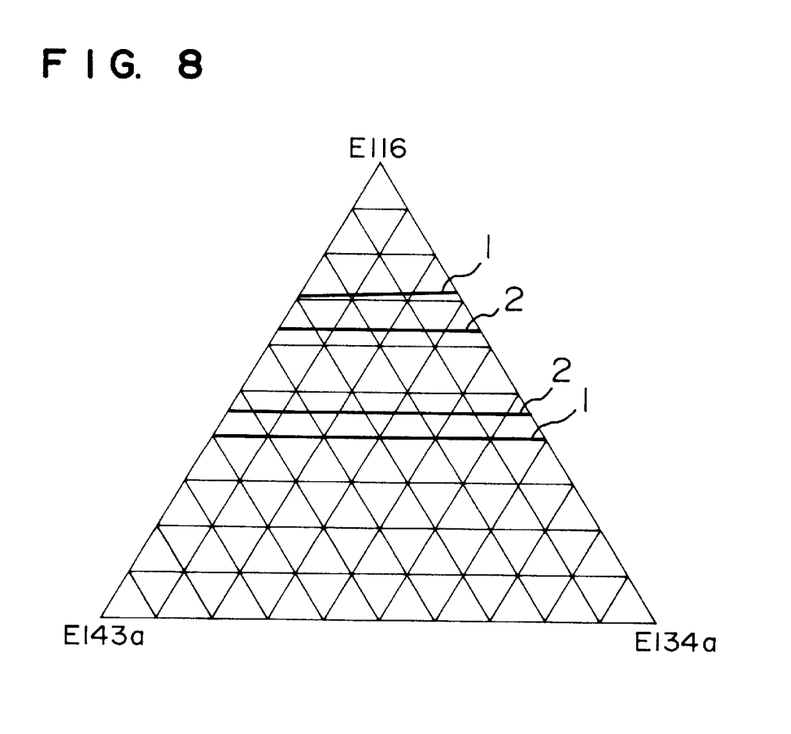
FIG. 8 is a ternary diagram showing the equilibrium lines of a working fluid consisting of a mixture of three ethers, E116, E143a and E134a at a constant temperature under a constant pressure.

FIG. 8 is a ternary diagram showing the equilibrium conditions of an ether mixture, which consists of three ethers, perfluorodimethylether (E116, $CF_3$—O—$CF_3$, bp. −59° C.), trifluorodimethylether (E143a, $CF_3$—O—$CH_3$, bp. −23° C.), and tetrafluorodimethylether (E134a, $CF_3$—O—$CH_2F$, bp. −20° C.), at a constant temperature under a constant pressure using triangular coodinate. In FIG. 8, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2G$.

In this case, the composition consisting of about 40 to about 70% by weight E116, 0 to about 60% by weight E143a, and 0 to about 60% by weight E134a is preferred because it has almost the same vapor pressure as that of R22, and the composition consisting of about 45 to about 65% by weight E116, 0 to about 55% by weight E143a, and 0 to about 55% by weight E134a is most preferred.

Figure 9:
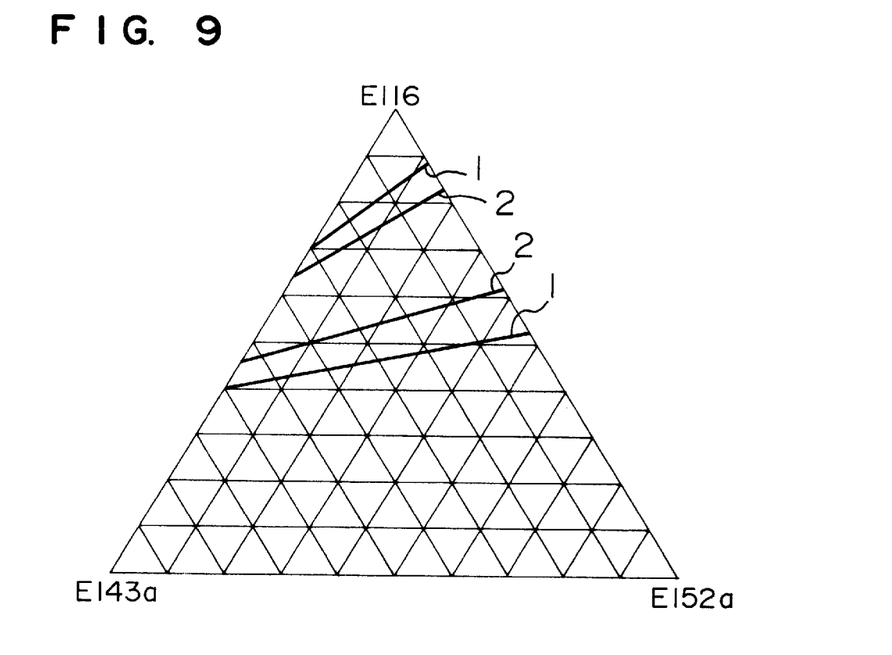
FIG. 9 is a ternary diagram showing the equilibrium lines of a working fluid consisting of a mixture of three ethers, E116, E143a and E152a at a constant temperature under a constant pressure.

FIG. 9 is a ternary diagram showing the equilibrium conditions of an ether mixture, which consists of three ethers, perfluorodimethylether (E116, $CF_3$—O—$CF_3$, bp. −59° C.), trifluorodimethylether (E143a, $CF_3$—O—$CH_3$, bp. 23° C.), and difluorodimethylether (E152a, $CHF_3$—O—$CH_3$, bp. −5° C.), at a constant temperature under a constant pressure using triangular coodinate. In FIG. 9, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2G$.

In this case, the composition consisting of about 40 to about 90% by weight E116, 0 to about 60% by weight E143a, and 0 to about 50% by weight E152a is preferred because it has almost the same vapor pressure as that of R22, and the composition consisting of about 45 to about 85% by weight E116, 0 to about 55% by weight E143a, and 0 to about 40% by weight E152a is most preferred.

Figure 10:
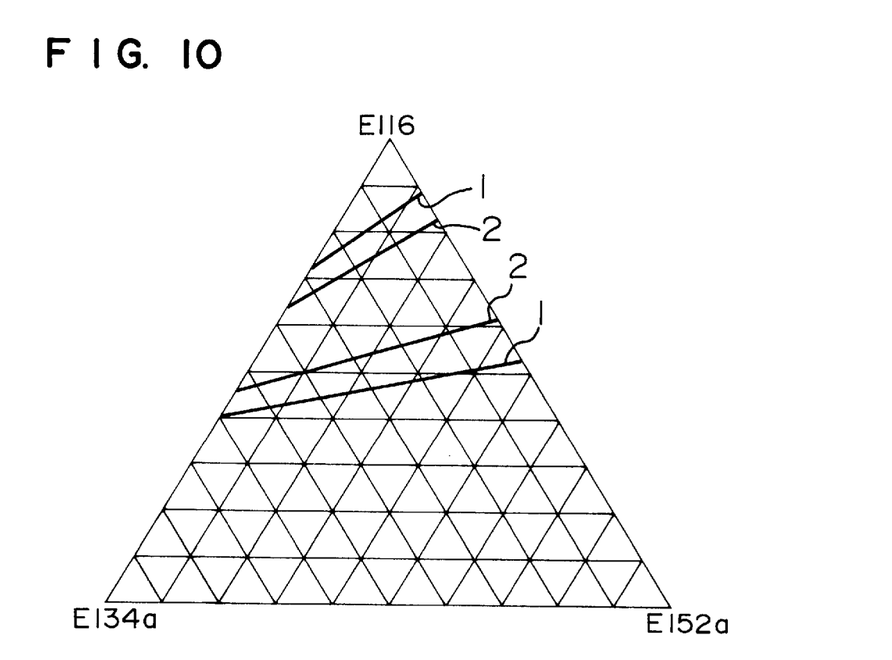
FIG. 10 is a ternary diagram showing the equilibrium lines of a working fluid consisting of a mixture of three ethers, E116, E134a and E152a at a constant temperature under a constant pressure.

FIG. 10 is a ternary diagram showing the equilibrium conditions of an ether mixture, which consists of three ethers, perfluorodimethylether (E116, $CF_3$—O—$CF_3$, bp. −59° C.), tetrafluorodimethylether (E134a, $CF_3$—O—$CH_2F$, bp. −20° C.) and difluorodimethylether (E152a, $CHF_2$—O—$CH_3$, bp. −5° C.), at a constant temperature under a constant pressure using triangular coodinate. In FIG. 10, the lines 1 are vapor-liquid phase equilibrium lines of the mixture at a temperature of 0° C. under a pressure of 4.044 $kg/cm^2G$, while the lines 2 are vapor-liquid phase equilibrium lines of the mixture at a temperature of 50° C. under a pressure of 18.782 $kg/cm^2G$.

In this case, the composition consisting of about 40 to about 90% by weight E116, 0 to about 60% by weight E134a, and 0 to about 50% by weight E152a is preferred because it has almost the same vapor pressure as that of R22, and the composition consisting of about 45 to about 85% by weight E116, 0 to about 55% by weight E134a, and 0 to about 40% by weight E152a is most preferred.

Summarizing the foregoing, preferred is a mixed working fluid comprising 15 to 90% by weight perfluorodimethylether and one or two of fluorinated dimethylethers having two carbon atoms, one oxygen atom, hydrogen atoms and fluorine atoms selected from the group consisting of 85% by weight or less pentafluorodimethylether, 50% by weight of less dimethylether, 60% by weight or less trifluorodimethylether, 60% by weight of less tetrafluorodimethylether, and 50% by weight or less difluorodimethylether.

Most preferred is a mixed working fluid comprising 15 to 85% by weight perfluorodimethylether and one or two selected from the group consisting of 85% by weight or less pentafluorodimethylether, 45% by weight or less dimethylether, 55% by weight or less trifluorodimethylether, 55% by weight or less tetrafluorodimethylether, and 40% by weight or less difluorodimethylether.

When only one of fluorinated dimethylethers having two carbon atoms, one oxygen atom, hydrogen atoms and fluorine atoms is selected, there is produced a two component mixed working fluid consisting of perfluorodimethylether and the selected fluorodimethylether. In such case, a composition having the same vapor pressure as that of R22 should be preferably in the regions on the sides of the triangle of the ternary diagram.

In the above Examples, though the working fluids are composed of a mixture of two or three ethers, one or more of geometrical isomers of trifluorodimethylether, tetrafluorodimethylether, and difluorodimethylether may be added to produce a working fluid consisting of a mixture of four or more ethers naturally.

Alternatively, besides perfluorodimethylether and the fluorinated dimethylethers consisting of only two carbon atoms, one oxygen atom, and hydrogen atoms and fluorine atoms, there may be added fluorinated hydrocarbons containing no chlorine. In this case, it is preferred to mix fluorinated hydrocarbons containing no chlorine having a boiling point close to that of R22 such as difluoromethane ($CH_2F_2$, R32, bp. −52° C.), pentafluoroethane ($CF_3$—$CHF_2$, R125, bp. −48° C.), 1,1,1-trifluoroethane ($CF_3$—$CH_3$, R143a, bp. −48° C.), 1,1,1,2-tetrafluoroethane ($CF_3$—$CH_2F$, R134a, bp. −27° C.), and 1,1-difluoroethane ($CHF_2$—$CH_3$, R152a, bp. −25° C.).

Moreover, these mixtures are expected to be non-azeotopic mixtures having a temperature gradient in the course of condensation and evaporation so that they will afford a higher coefficient of performance than that of R22 by constituting a Lorenz Cycle having a temperature difference close to heat source fluids.

As evident from the foregoing, the present invention provides a working fluid which consists of a mixture of ethers containing no chlorine in their molecular structure comprising 15 to 90% by weight perfluorodimethylether and one or two selected from fluorinated dimethylethers consisting of only two carbon atoms, one oxygen atom, hydrogen atoms and fluorine atoms in a specified proportion, thereby achieving the following effects:

(1) It is possible to provide a wide variety of working fluids to be selected which have little or a much smaller influence on the stratosphere ozone layer than that by R22.

(2) It is possible to provide a working fluid which has an identical vapor pressure to that of R22 at temperatures of operating the appliances which are difficult. to use with perfluorodimethylether alone and which can be empolyed as substitute for R22 in the existing appliances.

(3) It is possible to provide a working fluid which can be expected to afford a higher coefficient performance than that of R22 by utilizing the temperature gradient characteristics of the non-azeotopic mixture.

What is claimed is:

1. A mixed working fluid comprising 15 to 90% by weight perfluorodimethylether and one or two dimethylethers selected from the group consisting of 50% by weight or less dimethylether, 60% by weight or less trifluorodimethylether and 50% by weight or less difluorodimethylether, wherein at least one dimethylether other than perfluorodimethylether is present in the mixed working fluid, which has a composition in a range between phase equilibrium lines between 0° C. and 50° C. which has the same vapor pressure of chlorodifluoromethane.

2. The mixing working fluid according to claim 1, comprising 40 to 80% by weight perfluorodimethylether and at least one member selected from the group consisting of 50% by weight or less dimethylether and 60% by weight or less trifluorodimethylether, wherein at least one of dimethylether and trifluorodimethylether is present in the mixed working fluid.

3. The mixing working fluid according to claim 1, comprising 40 to 80% by weight perfluorodimethylether and 50% by weight or less dimethylether.

4. The mixing working fluid according to claim 1, comprising 50 to 90% by weight perfluorodimethylether and at least one member selected from the group consisting of 50% by weight or less dimethylether and 50% by weight or less difluorodimethylether, wherein at least one of dimethylether and difluorodimethylether is present in the mixed working fluid.

5. The mixing working fluid according to claim 1, comprising 40 to 70% by weight perfluorodimethylether and 60% by weight or less trifluorodimethylether.

6. The mixing working fluid according to claim 1, comprising 40 to 90% by weight perfluorodimethylether and at least one member selected from the group consisting of 60% by weight or less trifluorodimethylether and 50% by weight or less difluorodimethylether, wherein at least one of trifluorodimethylether and difluorodimethylether is present in the mixed working fluid.

7. The mixing working fluid according to claim i, comprising 40 to 90% by weight perfluorodimethylether and 50% by weight or less difluorodimethylether.

8. A mixed working fluid comprising (a) 15 to 90% by weight perfluorodimethylether having a formula $CF_3$—O—$CF_3$, (b) 85% by weight or less pentafluorodimethylether having a formula $CF_3$—O—$CHF_2$, and (c) a dimethylether selected from the group consisting of 50% by weight or less dimethylether having a formula $CH_3$—O—$CH_3$, 60% by weight or less trifluorodimethylether having a formula $CF_3$—O—$CH_3$, 60% by weight or less tetrafluorodimethylether having a formula $CF_3$—O—$CH_2F$, and 50% by weight or less difluorodimethylether having a formula $CHF_2$—O—$CH_3$, wherein dimethylethers of all of (a), (b) and (c) are present in the mixed working fluid, which has a composition in a range between phase equilibrium lines between 0° C. and 50° C. which has the same vapor pressure of chlorodifluoromethane.

9. The mixing working fluid according to claim 8, comprising 15 to 80% by weight perfluorodimethylether, 85% by weight or less pentafluorodimethylether and 50% by weight or less dimethylether, wherein both pentafluorodimethylether and dimethylether are present in the mixed working fluid.

10. The mixing working fluid according to claim 8, comprising 15 to 70% by weight perfluorodimethylether, 85% by weight or less pentafluorodimethylether and 60% by weight or less trifluorodimethylether, wherein both pentafluorodimethylether and trifluorodimethylether are present in the mixed working fluid.

11. The mixed working fluid according to claim 8, comprising 15 to 70% by weight perfluorodimethylether having the formula $CF_3$—O—$CF_3$, 85% by weight or less pentafluorodimethylether having the formula $CF_3$—O—$CHF_2$, and 60% by weight or less tetrafluorodimethylether having the formula $CF_3$—O—$CH_2F$, wherein both pentafluorodimethylether having the formula $CF_3$—O—$CHF_2$ and tetrafluorodimethylether having the formula $CF_3$—O—$CH_2F$ are present in the mixed working fluid.

12. The mixing working fluid according to claim 8, comprising 15 to 90% by weight perfluorodimethylether, 85% by weight or less pentafluorodimethylether and 50% by weight or less difluorodimethylether, wherein both pentafluorodimethylether and difluorodimethylether are present in the mixed working fluid.

* * * * *